United States Patent [19]
Georger et al.

[11] Patent Number: 5,950,111
[45] Date of Patent: Sep. 7, 1999

[54] SELF-TERMINATING COAXIAL TO UNSHIELDED TWISTED-PAIR CABLE PASSIVE CATV DISTRIBUTION PANEL

[75] Inventors: William Hugo Georger, Toms River; John Anthony Rutkowski, Jackson, both of N.J.

[73] Assignee: Lucent Technologies Inc., Del.

[21] Appl. No.: 08/937,174

[22] Filed: Sep. 25, 1997

[51] Int. Cl.[6] .................................................. H04N 7/10
[52] U.S. Cl. .................................................. 455/3.1; 348/6
[58] Field of Search ............................ 361/58, 66, 65, 361/67, 68, 627, 728; 348/6, 12; 439/579, 578; 324/525, 537, 750, 754, 756, 761; 370/652, 653; 379/27; 455/3.1

[56] References Cited

U.S. PATENT DOCUMENTS

| | | | |
|---|---|---|---|
| 5,064,386 | 11/1991 | Dale et al. ............................... | 439/535 |
| 5,117,122 | 5/1992 | Hagarth et al. ......................... | 307/140 |
| 5,130,893 | 7/1992 | Straate et al. ........................... | 361/292 |
| 5,216,499 | 6/1993 | Berkheimer .............................. | 348/6 |
| 5,366,388 | 11/1994 | Freeman et al. ........................ | 439/540 |
| 5,434,628 | 7/1995 | Spiero et al. ............................ | 348/705 |
| 5,486,877 | 1/1996 | Janaka ..................................... | 348/705 |
| 5,599,190 | 2/1997 | Willette .................................... | 342/6 |
| 5,623,542 | 4/1997 | Schweider et al. ..................... | 379/399 |

Primary Examiner—Victor R. Kostak

[57] ABSTRACT

The invention provides an apparatus, system and method for distributing passively a coaxial based CATV RF signal over unshielded twisted-pair cables. The distribution of the coaxial based CATV RF signal involves distributing the signal into a group of output signals. The output signals are then coupled to unshielded twisted-pair cables. If the unshielded twisted-pair cable is detached, the output signal is terminated through a resistor. Thus, a coaxial based CATV RF signal can be distributed to many unshielded twisted-pair cables with any unused output signals being properly terminated.

11 Claims, 4 Drawing Sheets

SELF-TERMINATING COAXIAL TO UNSHIELDED TWISTED-PAIR CABLE PASSIVE CATV DISTRIBUTION PANEL

FIELD OF THE INVENTION

This invention relates to the communications field, and particularly to distributing coaxial Community Antenna Television (CATV) based RF signals over unshielded twisted-pair cables in a manner that facilitates easy expansion, easy installation, and easy administration.

BACKGROUND OF THE INVENTION

In communication systems, efficient signal transmission can be complicated and compromised by the need to increase the capacity of the system, the ability to maintain the system, and the compatibility of different cabling, including the bandwidth capacity of the cabling.

Broadband CATV RF signals are often times delivered over standard coaxial cable. The signal is carried over a "trunk" cable, that is not directly connected to the user's devices, but is used to deliver the signal to the vicinity of the users. A tapped feeder cable is routed from the trunk to the end user, providing the end user with the broadband CATV RF signal.

Expansion of the communications system can be accomplished by adding tapped feeder cables or by splitting the tapped feeder cable. In either case, new coaxial cabling must be installed for each new user. In addition, each time a cable is split, the power to each end user is also split. At some point, another amplifier is required to provide the requisite levels for reliable usage. The size or the number of amplifiers may be difficult to gauge if one cannot accurately predict how many additional users may be added in the future. Expanding coaxial based systems becomes costly.

It is desirable, therefore, to facilitate expansion of coaxial based systems by exploiting existing cabling. Unshielded twisted-pair cabling is already available in the physical structure of offices and homes for the transmission of analog voice signals. Lucent Technologies, Inc.'s SYSTIMAX® SCS technology provides for the transmission of broadband CATV RF signals over unshielded twisted-pair cabling; consequently, coaxial based CATV RF signals can be brought to the desk using the existing wiring in the building.

When a cable carrying a broadband RF signal is disconnected, the signal is emitted into the environment unless properly terminated. If a technician is aware of the uncoupled cable, a termination device can be attached and the signal properly terminated. If the uncoupled cable goes undetected, the non-terminated signal radiates energy. Thus, the power in the original signal must be increased to compensate for the loss incurred through improper termination. In addition, the radiated signals can cause unwanted interference with other communications sources.

Accordingly, there is a need to provide a self-terminating distribution device to facilitate the distribution of coaxial based CATV RF signals over unshielded twisted-pair cabling.

SUMMARY OF THE INVENTION

The present invention is a device that can distribute a coaxial based signal over unshielded twisted-pair cables. The disclosed technique distributes the coaxial based CATV RF signal into a group of output signals that are coupled to unshielded twisted-pair cables; however, the output signals are automatically terminated when the unshielded twisted-pair cable is detached. It is because of the self-terminating function that the signal can be delivered over unshielded twisted-pair cables without additional intervention but more importantly, without any radiated losses.

In an exemplary embodiment of the present invention, a coaxial based CATV RF signal is directed through an input connector. A splitting circuit receives the signal through the connector and separates the signal into a group of output signals. The output signals are then coupled to unshielded twisted-pair cables. A termination device is connected to the output signal when the unshielded twisted-pair cable is uncoupled from the output signal. By providing a termination device, the radiated loss associated with unterminated signals is virtually eliminated. Amplification requirements are easily derived and consistent. Thus, a single coaxial based signal can be reliably distributed to many unshielded twisted-pair cables without the need of additional operator assistance.

Advantageously, the present invention can be used in applications where a RF signal originates from a coaxial cable but can be more effectively distributed over unshielded twisted-pair cabling. In addition, the self-terminating modular design is ideal for distribution panels in telecommunications closets where easy installation and administration are paramount concerns. The present invention is a versatile and simple solution for distributing coaxial based CATV RF signals over unshielded twisted-pair cabling.

BRIEF DESCRIPTION OF THE DRAWINGS

A more complete understanding of the present invention may be obtained from consideration of the following description in conjunction with the drawings in which.

DETAILED DESCRIPTION

Figure 1:
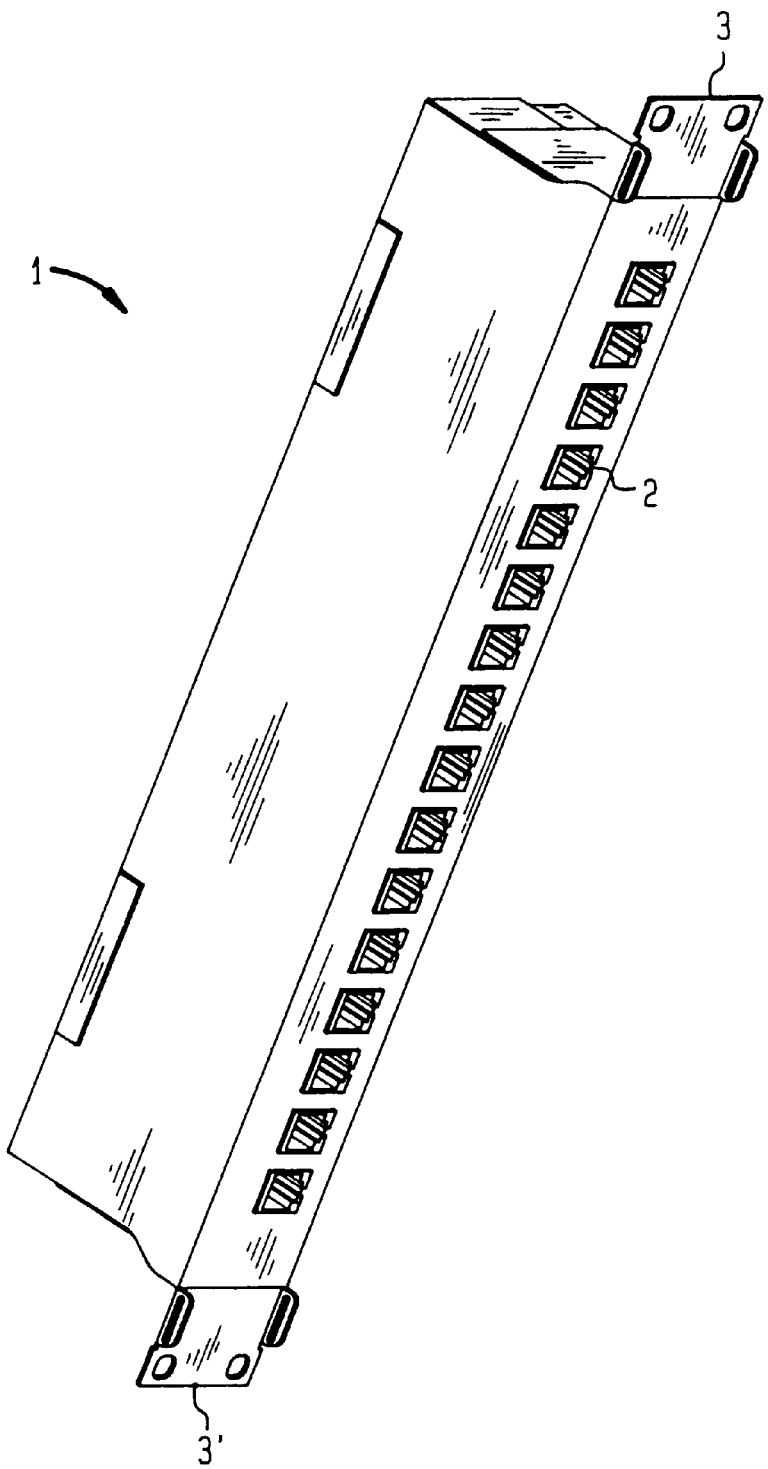
FIG. 1 is a front view of an exemplary embodiment of the present invention distribution panel.
Figure 2:
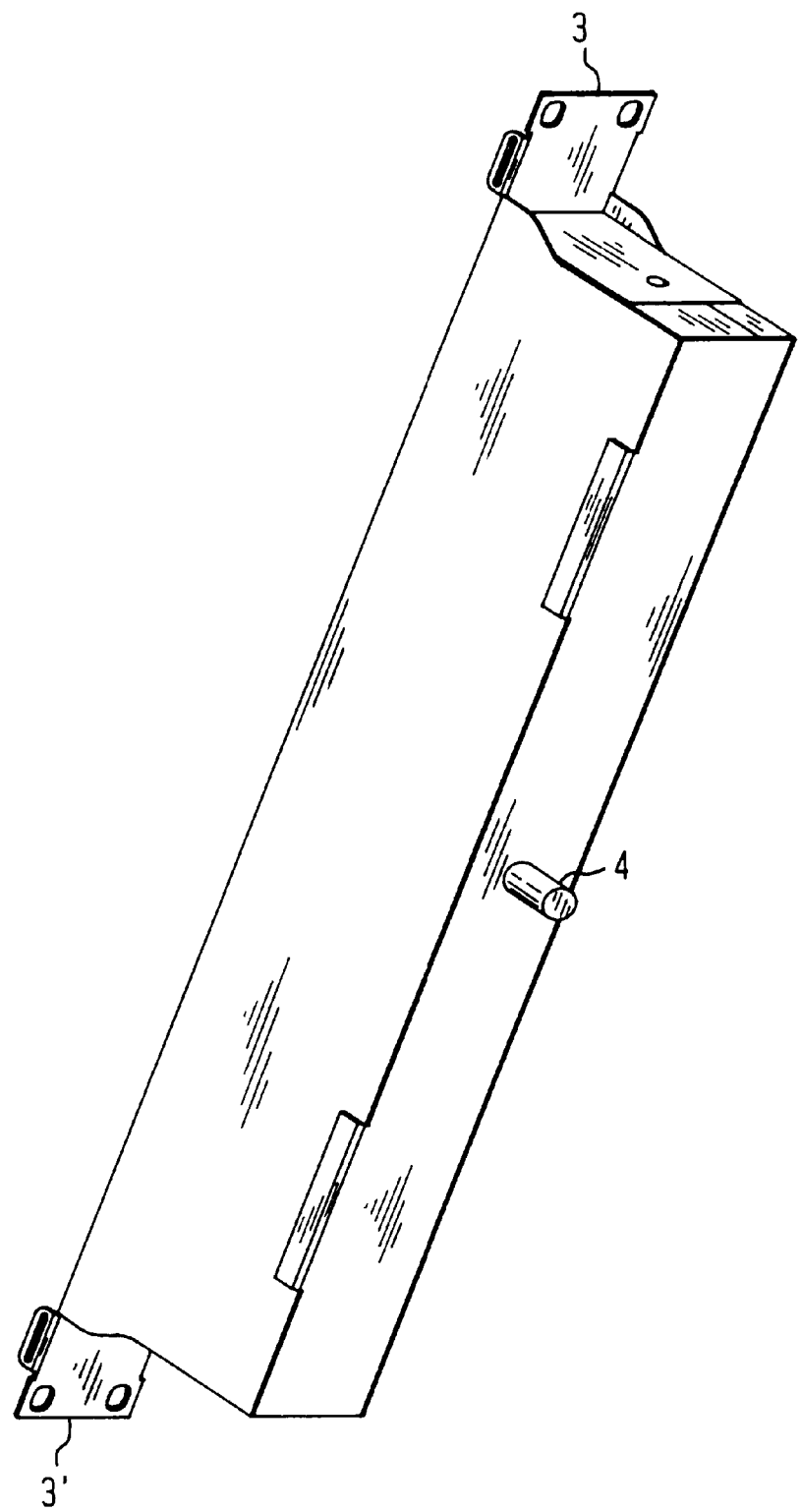
FIG. 2 is a rear view of an exemplary embodiment of the present invention distribution panel.

Referring to FIG. 1 and FIG. 2, there is shown an exemplary embodiment of a CATV distribution panel 1. Distribution panel 1 includes a plurality of 8-pin modular output jacks 2, a pair of mounting brackets 3, 3' and a F-type connector 4. An exemplary system for distributing coaxial based CATV RF signals over unshielded twisted-pair cabling is presented in FIG. 3. A coaxial based CATV RF signal 10 is fed to an input port 12. The input port can be designed to mimic the input port of a coaxial CATV splitter. In that case, the input port could be a standard female coaxial F-type connector.

Figure 3:
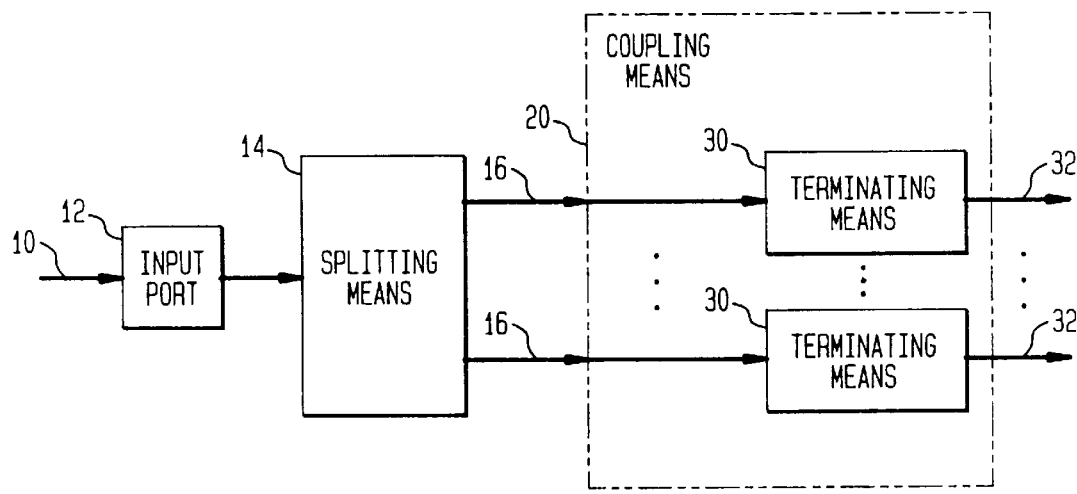
FIG. 3 is a block diagram of an exemplary distribution panel for the passive transmission of coaxial based CATV RF signals over unshielded twisted-pair cabling.

In FIG. 3 of the present invention, the splitting means 14 is coupled to the input port in order to receive the coaxial based CATV RF signal. The splitting means is designed to divide the coaxial based signal into a group of output signals 16. The number of output signals is designed to be a compromise between facilitating distribution of the coaxial CATV RF signal to as many end users as possible and the need to minimize losses such as insertion and isolation.

Insertion loss is defined as the ratio of the output power over the input power. Here, the insertion loss would be the ratio of the power of the output signal 16 over the power of the coaxial based signal 10. With a splitting ratio of 1 to 16, the insertion loss is designed to be 14.5 dB±1 dB across the frequency band although this loss could vary based on alternate splitting ratios or system requirements. Isolation loss is a measure of the unwanted power transferred between different output signals. Here, it is defined as the loss in decibels in the unwanted direction of propagation with all of the output signals properly terminated. For a splitting ratio of 1 to 16, the isolation loss is designed to be at least 20 dB although this loss could vary based on alternate splitting ratios or system requirements.

The coupling means 20 can be seen in the block diagram of the exemplary distribution system FIG. 3. The coupling means passes the output signals to the unshielded twisted-pair cables 32. The terminating means 30 can be seen within the coupling means. The terminating means is designed to properly terminate the output signal when an unshielded twisted-pair cable is not connected to an output signal. The terminating means has an impedance matched to the characteristic impedance of the unshielded twisted-pair cables, typically 100 ohms.

The terminating means is designed to automatically terminate the output signal when the output signal is disconnected, minimizing the return loss. The return loss is a measure of power reflected back to the source. This reflected signal can be out of phase with the source and can lead to destructive interference. The return loss is the number of decibels that the reflected signal is below the originating signal. For a distribution system with an 1 to 16 splitting ratio, the return loss is designed to be at least 15 dB across the frequency band although this loss could vary based on alternate splitting ratios or system requirements.

Figure 4:
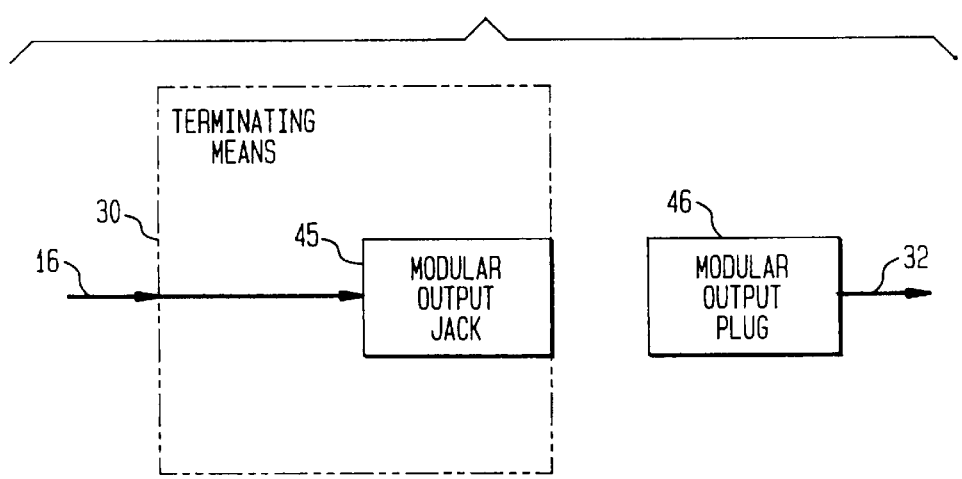
FIG. 4 is a block diagram of an exemplary terminator for terminating an output signal when the output signal is not connected to an unshielded twisted-pair cable.
Figure 5:
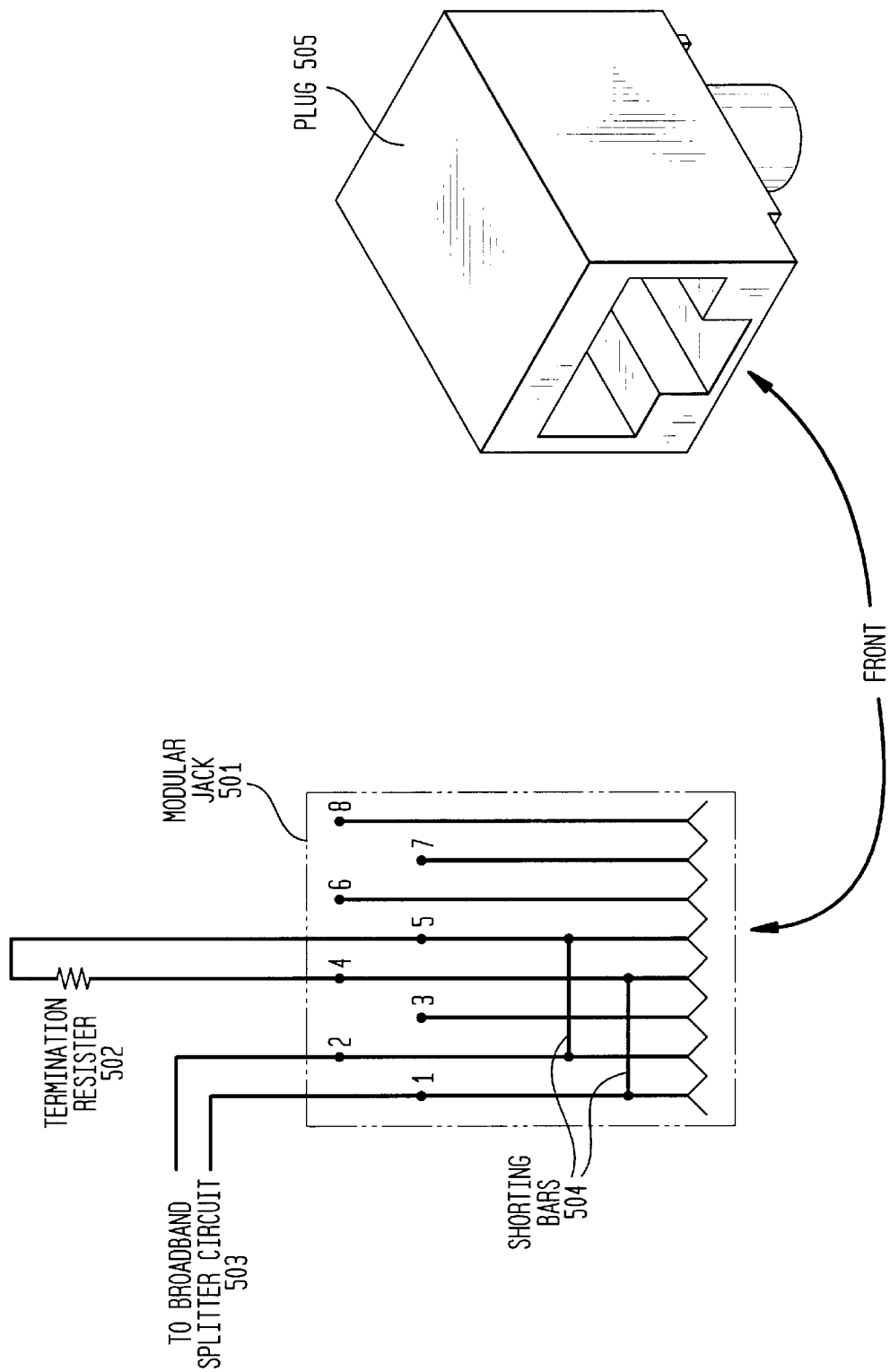
FIG. 5 is a detailed configuration of an exemplary embodiment of the invention.

In FIG. 4, the modular output jack 45 is depicted. The modular output jack is designed to receive and electronically engage a standard modular plug 46. As an example, a standard 8-pin modular jack can be employed with a first pair of pins being coupled to the output signal. The first pair of pins are designated as the transmit pins. In such a configuration, the output signal is terminated by shunting the two transmit pins to a second pair of pins within the modular output jack when the standard 8-pin modular plug is removed. The second pair of pins are designated as the terminating pins. A resistor is coupled to the two terminating pins. The resistor typically has a value of 100 ohms to match the characteristics impedance of the unshielded twisted-pair cable. FIG. 5 is a detailed schematic that illustrates the functionalities shown in block diagram form in FIG. 4. In particular, the configuration of modular jack 501 is shown in detail to include termination resistor 502, splitter circuit 503 and shorting bars 504. Note that when plug 505 is installed to modular jack 501, the shorting functionality is removed.

In an exemplary embodiment of the invention, the distribution panel is intended to accommodate the transmission of broadband CATV RF signals over unshielded twisted-pair cabling for frequencies up to 550 MHz. Although it is understood that the present invention can process carrier frequencies up to 750 MHz.

The exemplary passive distribution panel for the transmission of coaxial based CATV RF signals over unshielded twisted-pair cables solves the problem of delivering coaxial based CATV RF signals to multiple users within a telecommunications closet. In this instance, passive is meant to indicate a non-powered powered device. That is, no active devices are included in the distribution panel. As mentioned above, one envisioned use is in the telecommunications closet. Previously, distributing the coaxial based CATV RF signal through existing unshielded twisted-pair cabling required coaxial CATV splitters, individual coaxto-utp balun adapters and F-type terminators to provide the signal to each unshielded twisted-pair cable. As such, attempts to exploit the existing cabling of a telecommunications system were penalized by the need to engineer and install coaxial CATV splitters, numerous adapters each with their associated cordage, and terminators. With the present invention, installation is simply plug and play, eliminating the need for coaxial CATV splitters, individual adapters and terminators while providing uniformity in the distribution equipment. Thus, the distribution of coaxial based CATV RF signals over existing unshielded twistedpair cabling can be incorporated into a telecommunications closet with a single device. Benefits of the present invention are not just limited to the telecommunications closet. Indeed, any application where coaxial based CATV RF signals need to be distributed over unshielded twisted-pair cabling can benefit from the present invention.

It will be understood that the embodiment of the present invention specifically shown and described is merely exemplary and that a person skilled in the art can make alternate embodiments using different configurations and functionally equivalent components. All such alternate embodiments are intended to be included in the scope of this invention as set forth in the following claims.

What is claimed:

1. Device for distributing passively a coaxial based broadband signal over unshielded twisted-pair cable, said device comprising:

an input port for coupling the device to the coaxial based broadband signal;

a splitting means connected to the input port for distributing the coaxial based broadband signal into a plurality of output signals; and a coupling means for dispersing each of the plurality of output signals to a corresponding unshielded twisted-pair cable, each said corresponding unshielded twisted-pair cable having a characteristic impedance of $Z_1$, the coupling means comprising:

a terminating means associated with each of the plurality of output signals, each said terminating means having a first end and a second end, the first end of each said terminating means receiving one of the plurality of output signals and the second end of each said terminating means adapted to accept the corresponding unshielded twisted-pair cable, each said terminating means having an impedance $Z_2$ when the corresponding unshielded twisted-pair cable is uncoupled from said one of the plurality of output signals, the impedance $Z_2$ being equal to the characteristic impedance $Z_1$, of the corresponding unshielded twisted-pair cable.

2. The device according to claim 1, wherein the coaxial based broadband signal is a CATV RF broadband signal.

3. The device according to claim 1, wherein the plurality of output signals are automatically uncoupled to each said terminating means when the corresponding unshielded twisted-pair cable is attached.

4. The device according to claim 2, wherein each said terminating means is a modular output jack associated with said one of the plurality of output signals.

5. A system for distributing passively a coaxial based CATV RF signal over an unshielded twisted-pair cable comprising:

a coaxial cable connector;

a splitting circuit coupled to the coaxial cable connector; the splitting circuit having a plurality of outputs; and a plurality of self-terminating modular output jacks coupled to a corresponding output of the splitting circuit.

6. The system according to claim 5, wherein each of the plurality of self-terminating modular output jacks comprises:

a first transmit pin and a second transmit pin, the first transmit pin and the second transmit pin being coupled to an output of the splitting circuit;

a first terminating pin and a second terminating pin, the first transmit pin being shunted to the first terminating pin and the second transmit pin being shunted to the second terminating pin; and a resistor connected between the first terminating pin and the second terminating pin.

7. A method for distributing passively a coaxial based broadband signal over an unshielded twisted-pair cable, comprising the steps of:

splitting the coaxial based broadband signal into a plurality of output signals;

coupling a plurality of unshielded twisted-pair cables to a corresponding output signal, each of said plurality of unshielded twisted-pair cables having a characteristic impedance of $Z_1$; and terminating the corresponding output signal when one of said plurality of unshielded twisted-pair cables is not coupled to the corresponding output signal.

8. The method according to claim 7, in which the terminating step includes the step of:

providing an impedance $Z_2$ equal to the characteristic impedance $Z_1$, of each of said plurality of unshielded twisted-pair cables when one of said unshielded twisted-pair cables is not connected to the corresponding output signal.

9. The method according to claim 8, in which the terminating step includes the step of:

automatically uncoupling said impedance $Z_2$ from the corresponding output signal when one of said plurality of unshielded twisted-pair cables is coupled to the corresponding output signal.

10. The method according to claim 7, in which the coupling step comprises the steps of:

providing a plurality of modular output jacks for receiving one of said plurality of output signals; and joining one of said plurality of modular output jacks to one of said plurality of unshielded twisted-pair cables.

11. The method according to claim 7, wherein the coaxial based broadband signal is a CATV RF broadband signal.

* * * * *